(12) United States Patent
Wajcer et al.

(10) Patent No.: US 8,514,966 B2
(45) Date of Patent: Aug. 20, 2013

(54) HIGH-PERFORMANCE FASTER-THAN-NYQUIST (FTN) SIGNALING SCHEMES

(75) Inventors: Daniel Wajcer, Beit Yehoshua (IL); Uri Beitler, Rehovot (IL)

(73) Assignee: Novelsat Ltd., Ra'Anana (IL)

( * ) Notice: Subject to any disclaimer, the term of this patent is extended or adjusted under 35 U.S.C. 154(b) by 180 days.

(21) Appl. No.: 13/060,060

(22) PCT Filed: Oct. 22, 2009

(86) PCT No.: PCT/IB2009/054672
§ 371 (c)(1),
(2), (4) Date: Feb. 22, 2011

(87) PCT Pub. No.: WO2010/049858
PCT Pub. Date: May 6, 2010

(65) Prior Publication Data
US 2011/0188550 A1    Aug. 4, 2011

Related U.S. Application Data

(60) Provisional application No. 61/108,597, filed on Oct. 27, 2008.

(51) Int. Cl.
*H04B 15/00* (2006.01)
(52) U.S. Cl.
USPC ........... 375/285; 342/352; 342/358; 375/229; 375/296; 398/121; 398/193; 455/3.02; 455/114.3

(58) Field of Classification Search
None
See application file for complete search history.

(56) References Cited

U.S. PATENT DOCUMENTS

| | | | |
|---|---|---|---|
| 6,653,959 B1 * | 11/2003 | Song | 341/131 |
| 7,257,181 B2 * | 8/2007 | Jones et al. | 375/350 |
| 2003/0123568 A1 * | 7/2003 | Ophir et al. | 375/296 |
| 2005/0071877 A1 * | 3/2005 | Navarro | 725/68 |
| 2006/0210070 A1 * | 9/2006 | Reznik et al. | 380/33 |
| 2007/0165578 A1 * | 7/2007 | Yee et al. | 370/337 |
| 2008/0018802 A1 * | 1/2008 | Yu | 348/728 |

OTHER PUBLICATIONS

International Application PCT/IB2009/054672 Search Report dated May 19, 2010.
Liveris et al., "Exploiting faster-than-Nyquist signaling", IEEE Transactions on Communications, vol. 51, No. 9, pp. 1502-1511, Sep. 2003.

(Continued)

*Primary Examiner* — Adolf Dsouza
(74) *Attorney, Agent, or Firm* — D. Kligler I.P. Services Ltd.

(57) ABSTRACT

A method for communication includes modulating data to produce a series of symbols defined in a signal space. The symbols are pulse-shaped using a given pulse shape. A signal, which includes a sequence of the pulse-shaped symbols (104A . . . 104C) transmitted at a symbol rate that is higher than a Nyquist rate defined for the given pulse shape, is transmitted to a receiver (40). Prior to pulse-shaping the symbols, Inter-Symbol Interference (ISI) in the signal is pre-compensated for by applying a lattice precoding operation to the symbols. The lattice precoding operation confines the symbols to a predefined volume (110) in the signal space and is computed independently of any feedback from the receiver.

42 Claims, 5 Drawing Sheets

(56) References Cited

OTHER PUBLICATIONS

ETSI standard EN 302 307, "Digital video broadcasting (DVB); Second generation framing structure, channel coding and modulation systems for broadcasting, interactive services, news gathering and other broadband satellite applications", version 1.1.2, Jun. 2006.
Jelinek et al., "Instrumentable tree encoding of information sources", IEEE Transactions on Information Theory, vol. IT-17, issue 1, pp. 118-119, Jan. 1971.
Simmons, S. J., "Breadth-first trellis decoding with adaptive effort", IEEE Transactions on Communications, vol. 38, No. 1, pp. 3-12, Jan. 1990.
Wong, K.K.Y., "The Soft-Output M-Algorithm and Its Applications," Ph.D. Thesis, Department of Electrical and Computer Engineering, Queen's University, Kingston, Canada, Aug. 2006.
Rusek et al., "Non Binary and Precoded Faster Than Nyquist Signaling", IEEE Transactions on Communications, vol. 56, No. 5, pp. 808-817, May 2008.
Rusek et al., "Constrained Capacities for Faster-than-Nyquist Signaling", IEEE Transactions on Information Theory, vol. 55, issue 2, pp. 764-775, Feb. 2009.
Erez et al., "Capacity and Lattice Strategies for Canceling Known Interference", IEEE Transactions on Information Theory, vol. 51, No. 11, pp. 3820-3833, Nov. 2005.
Zamir et al., "Nested Linear/Lattice Codes for Structured Multiterminal Binning", IEEE Transactions on Information Theory, vol. 48, No. 6, pp. 1250-1276, Jun. 2002.
Wesel et al., "Achievable Rates for Tomlinson-Harashima Precoding", IEEE Transactions on Information Theory, vol. 44, No. 2, pp. 824-831, Mar. 1998.
Tomlinson, M., "New automatic equalizer employing modulo arithmetic", IEEE Electronic Letters, vol. 7, Nos. 5/6, pp. 138-139, Mar. 25, 1971.
Nana et al., "Improved decoding of LDPC coded modulations," IEEE Communication Letters, vol. 10, No. 5, pp. 375-377, May 2006.
Laroia et al., "A simple and effective precoding scheme for noise whitening on intersymbol interference channels," Technical Research Report TR_92-2, University of Maryland, year 1992.
Mazo, J. E., "Faster than Nyquist signaling", The Bell System Technical Journal, vol. 54, No. 8, pp. 1451-1462, Oct. 1975.
Forney, G.D., "Maximum-likelihood sequence estimation of digital sequences in the presence of intersymbol interference", IEEE Transactions on Information Theory, vol. IT-18, No. 3, pp. 363-378, May 1972.
Ungerboeck, G., "Adaptive maximum-likelihood receiver for carrier-modulated data-transmission systems," IEEE Transactions on Communications, vol. com-22, No. 5, pp. 624-636, May 1974.
Bahl et al., "Optimal Decoding of Linear Codes for minimizing symbol error rate", IEEE Transactions on Information Theory, vol. IT-20, No. 2, pp. 284-287, Mar. 1974.
Nguyen et al., "Optimal Soft-Output Viterbi Algorithm," 3rd International Conference on Networking (ICN 04), Guadeloupe, France, Mar. 2004.
Hagenauer et al., "A Viterbi algorithm with soft-decision outputs and its applications", Proceedings of IEEE Global Telecommunications Conference, pp. 1680-1686, Dallas, USA, Nov. 1989.
Liveris, A.D., "On distributed coding, quantization of channel measurements and faster-than-Nyquist signaling," PhD Dissertation, Department of Electrical Engineering, Texas AT&M University, Dec. 2004.

\* cited by examiner

HIGH-PERFORMANCE FASTER-THAN-NYQUIST (FTN) SIGNALING SCHEMES

CROSS-REFERENCE TO RELATED APPLICATIONS

This application claims the benefit of U.S. Provisional Patent Application 61/108,597, filed Oct. 27, 2008, whose disclosure is incorporated herein by reference.

FIELD OF THE INVENTION

The present invention relates generally to communication systems, and particularly to methods and systems for Faster-Than-Nyquist (FTN) signaling.

BACKGROUND OF THE INVENTION

Faster-Than-Nyquist (FTN) is a signaling technique in which a sequence of pulse-shaped symbols is transmitted at a symbol rate that is higher than the Nyquist rate defined for the pulse shape being used. FTN was originally presented by Mazo in "Faster-Than-Nyquist Signaling," Bell Systems Technical Journal, volume 54, October, 1975, pages 1451-1462, which is incorporated herein by reference.

Several communication techniques that use FTN have been described. For example, Liveris and Georghiades describe FTN techniques that use raised-cosine pulses in "Exploiting Faster-Than-Nyquist Signaling," IEEE Transactions on Communications, volume 51, September, 2003, pages 1502-1511, which is incorporated herein by reference. Rusek and Anderson describe FTN techniques that use non-binary signal constellations and precoding filters, in "Non Binary and Precoded Faster Than Nyquist Signaling," IEEE Transactions on Communication, volume 56, number 5, May, 2008, pages 808-817, which is incorporated herein by reference.

Communication systems sometimes use transmitter precoding schemes in order to mitigate impairments such as Inter-Symbol Interference (ISI). An example precoding technique, known as the Tomlinson-Harashima Precoding (THP), is described by Tomlinson in "New Automatic Equalizer Employing Modulo Arithmetic," IEEE Electronic Letters, volume 7, number 5, March, 1971, pages 138-139, which is incorporated herein by reference. Wesel and Cioffi present maximum bounds on the achievable information rates of several THP schemes in "Achievable Rates for Tomlinson-Harashima Precoding," IEEE Transactions on Information Theory, volume 44, number 2, March, 1998, pages 824-831, which is incorporated herein by reference. Another precoding scheme, referred to as Laroia-Tretter-Farvardin precoding, is described by Laroia et al., in "A Simple and Effective Precoding Scheme for Noise Whitening on Intersymbol Interference Channels," IEEE Transactions on Communication, volume 41, number 10, October, 1993, pages 1460-1463, which is incorporated herein by reference.

Other precoding schemes involve lattice coding. Interference cancellation using lattice coding is described, for example, by Erez et al., in "Capacity and Lattice Strategies for Cancelling Known Interference," IEEE Transactions on Information Theory, volume 51, number 11, November, 2005, pages 3820-3833, which is incorporated herein by reference. Other lattice coding techniques are proposed by Zamir et al., in "Nested Linear/Lattice Codes for Structured Multiterminal Binning," IEEE Transactions on Information Theory, volume 48, number 6, June, 2002, pages 1250-1276, which is incorporated herein by reference.

SUMMARY OF THE INVENTION

An embodiment of the present invention provides a method for communication, including:

modulating data to produce a series of symbols defined in a signal space;

pulse-shaping the symbols using a given pulse shape;

transmitting to a receiver a signal, which includes a sequence of the pulse-shaped symbols transmitted at a symbol rate that is higher than a Nyquist rate defined for the given pulse shape; and prior to pulse-shaping the symbols, pre-compensating for Inter-Symbol Interference (ISI) in the signal by applying to the symbols a lattice precoding operation that confines the symbols to a predefined volume in the signal space and is computed independently of any feedback from the receiver.

In some embodiments, transmitting the signal includes transmitting the signal toward a satellite, so as to cause the satellite to retransmit the signal to the receiver. In alternative embodiments, modulation of the data, pulse-shaping of the symbols and pre-compensation for the ISI are performed on-board a satellite. In a disclosed embodiment, transmitting the signal includes transmitting a Digital Video Broadcast (DVB) signal.

In an embodiment, applying the lattice precoding operation includes performing a modulo operation on the symbols. Applying the lattice precoding operation may include applying a Tomlinson-Harashima Precoding (THP) process. Additionally or alternatively, applying the lattice precoding operation may include applying a Laroia-Tretter-Farvardin precoding process. Further additionally or alternatively, applying the lattice precoding operation may include jointly applying the lattice precoding operation and a lattice channel coding operation. In another embodiment, applying the lattice precoding operation includes filtering the symbols using one or more filters having coefficients, and the method includes setting the coefficients independently of any feedback from the receiver.

In yet another embodiment, applying the lattice precoding operation includes defining the lattice precoding operation to compensate for additional ISI caused by transmitter circuitry that transmits the signal. In some embodiments, the method further includes applying a dithering signal to the transmitted signal, and removing the dithering signal at the receiver. In an embodiment, the method includes receiving the signal and reversing the lattice precoding operation at the receiver, so as to extract the data from the signal.

There is additionally provided, in accordance with an embodiment of the present invention, a method for communication, including:

pulse-shaping a series of symbols using a given pulse shape;

generating a signal, which includes a sequence of the pulse-shaped symbols transmitted at a symbol rate that is higher than a Nyquist rate defined for the given pulse shape; and transmitting the signal to a receiver, which is specified for receiving only signals whose symbol rates do not exceed the Nyquist rate.

In some embodiments, the method includes applying an equalizer at the receiver to the received signal, so as to compensate for Inter-Symbol Interference (ISI) introduced by the symbol rate higher than the Nyquist rate. Applying the equalizer may include initializing the equalizer with pre-computed coefficient values that compensate for the ISI. In an embodiment, transmitting the signal includes transmitting the signal toward a satellite, so as to cause the satellite to retransmit the signal to the receiver. Alternatively, pulse-shaping of the symbols and generation of the signal may be performed on-board a satellite. In a disclosed embodiment, transmitting the signal includes transmitting a Digital Video Broadcast (DVB) signal.

In some embodiments, transmitting the signal includes operating in a first operational mode when transmitting to a first type of receivers specified for receiving first signals whose symbol rates exceed the Nyquist rate, and operating in a second operational mode, different from the first operational mode, when transmitting to a second type of receivers specified for receiving only second signals whose symbol rates do not exceed the Nyquist rate. In an embodiment, operating in the first operational mode includes precoding the signal prior to transmission, and operating in the second operational mode includes refraining from precoding the signal. In some embodiments, the second type of the receivers conforms to a second generation Digital Video Broadcast (DVB-S2) specification.

There is also provided, in accordance with an embodiment of the present invention, a communication apparatus, including:

transmission circuitry, which is configured to modulate data so as to produce a series of symbols defined in a signal space, to pulse-shape the symbols using a given pulse shape, and to transmit to a receiver a signal, which includes a sequence of the pulse-shaped symbols transmitted at a symbol rate that is higher than a Nyquist rate defined for the given pulse shape; and a precoding unit, which is configured to pre-compensate for Inter-Symbol Interference (ISI) in the signal prior to pulse-shaping the symbols by applying to the symbols a lattice precoding operation that confines the symbols to a predefined volume in the signal space and is computed independently of any feedback from the receiver.

There is further provided, in accordance with an embodiment of the present invention, a communication system, including:

a transmitter, which is configured to pulse-shape a series of symbols using a given pulse shape, to generate a signal, which includes a sequence of the pulse-shaped symbols transmitted at a symbol rate that is higher than a Nyquist rate defined for the given pulse shape, and to transmit the signal over a communication channel; and a receiver, which is specified for receiving only signals whose symbol rates do not exceed the Nyquist rate, and which is configured to receive the signal from the communication channel and to decode the received signal.

The present invention will be more fully understood from the following detailed description of the embodiments thereof, taken together with the drawings in which:

DETAILED DESCRIPTION OF EMBODIMENTS

Overview

Digital communication systems typically communicate by transmitting a sequence of pulse-shaped symbols from a transmitter to a receiver. For a given pulse shape p(t), the well-known Nyquist criterion maintains that p(t) will be free of Inter-Symbol Interference (ISI) if and only if $$p(kT_S) = \begin{cases} 0, & k \neq 0 \\ 1, & k = 0 \end{cases}$$

wherein p(t) is defined as p(t)≡conv(p1(t),p2(t)), p1(t) denotes the shaping filter in the transmitter, p2(t) denotes the matched filter in the receiver, cony( ) denotes a convolution operation, and $T_S$ denotes the symbol period. For a given pulse shape, the Nyquist criterion imposes a bandwidth limitation, i.e., defines a maximum symbol rate at which the signal will be free of ISI. This maximum rate is known as the Nyquist rate. When using Faster-Than-Nyquist (FTN) signaling, a sequence of pulse-shaped symbols is transmitted at a rate that is higher than the Nyquist rate. FTN signaling thus achieves higher throughput, but at the expense of ISI that should be compensated for.

Embodiments of the present invention that are described hereinbelow provide improved methods and systems for communication using FTN signals. Although the embodiments described herein refer mainly to satellite communication, the disclosed techniques are applicable to a wide variety of other communication applications.

In some embodiments, the transmitter pre-compensates for the ISI that will be introduced by the FTN signaling by filtering the symbol sequence using lattice precoding prior to pulse shaping. Typically, the lattice precoding operation limits the amplitude of the precoded symbols, e.g., by performing modulo operations. When the symbols are represented by coordinates in a signal space, the precoded symbols produced by the lattice precoding operation are confined to a finite volume in the signal space. As a result, the lattice precoding operation causes only a small and bounded increase in transmitter power. This feature is especially important in power-limited applications, such as satellite applications.

Moreover, in some of the disclosed methods, the filtering applied by the lattice precoding operation is computed independently of any feedback from the receiver. This feature reduces the bandwidth needed for management signaling, and also reduces system complexity. Feedback-independent precoding is particularly suitable for satellite applications in which the majority of ISI is generated by the transmitter, and the contribution of the communication channel to the ISI is relatively small. Feedback-independent precoding is also advantageous in unidirectional communication links that do not have a reverse link from the receiver to the transmitter, as well as in point-to-multipoint (e.g., broadcast) applications that transmit the same signal to multiple receivers. In addition to compensating for FTN-related ISI, the lattice precoding operation may be configured to compensate for other ISI sources. Such sources may comprise, for example, ISI caused by the communication channel between the transmitter and receiver and ISI caused by analog filtering in the transmitter.

In some embodiments, the transmitter transmits FTN signals to a receiver, which is specified to receive only non-FTN signals. The transmitter transmits a FTN signal, i.e., a sequence of symbols at a rate that is higher than the Nyquist rate. The receiver processes the received signal at this symbol rate, but irrespective of the fact that the signal is a FTN signal. In an example embodiment, the receiver comprises an adaptive equalizer, which compensates for the FTN-related ISI in the received signal. This scheme can be used for transmitting FTN signals to legacy receivers that do not support FTN, without requiring receiver modification. In some embodiments, the FTN transmitter operates in two operational modes—a FTN-aware mode and a legacy mode. The FTN-aware mode is used for transmitting to receivers that support FTN, typically at higher performance. The legacy mode, on the other hand, offers backward compatibility at the price of some performance degradation relative to an FTN-aware receiver, due to residual ISI.

System Description

Figure 1:
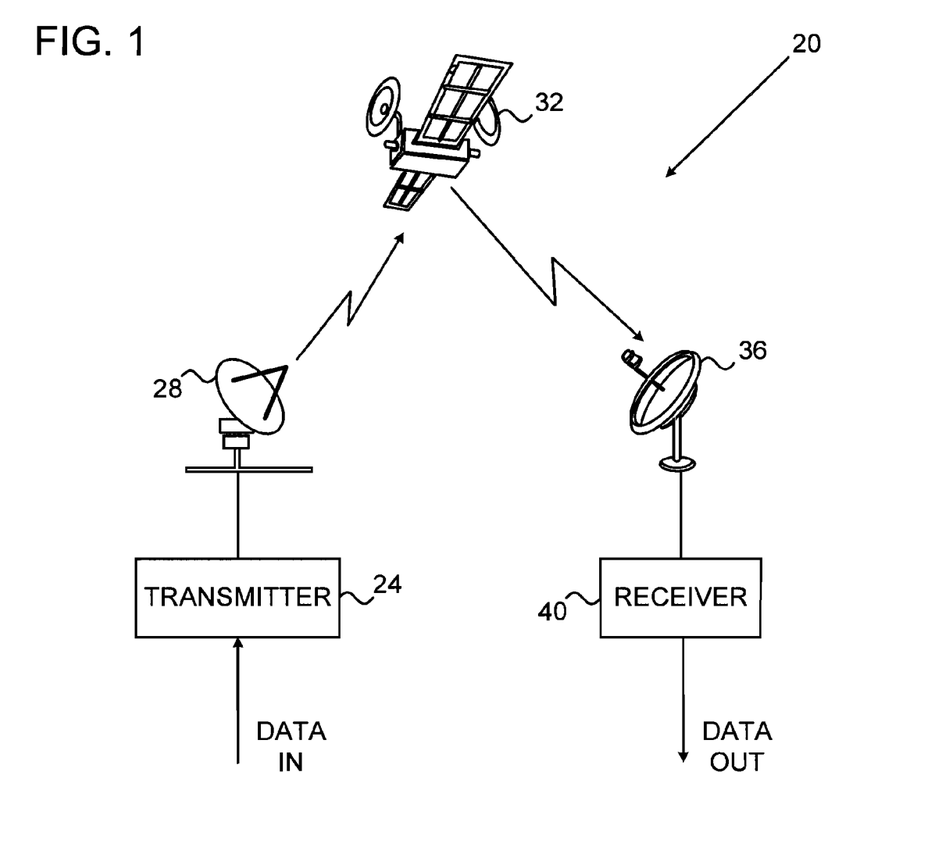
FIG. 1 is a block diagram that schematically illustrates a satellite communication system, in accordance with an embodiment of the present invention.

FIG. 1 is a block diagram that schematically illustrates a satellite communication system 20, in accordance with an embodiment of the present invention. System 20 comprises a transmitter 24, which accepts input data for transmission, generates a FTN signal that carries this data, and transmits the FTN signal via a transmit antenna 28 toward a satellite 32. The satellite re-transmits the signal, and the re-transmitted signal is received by a receiver 40 via a receive antenna 36. The receiver processes the received FTN signal so as to extract the data, and provides the data as output.

In some embodiments, transmitter 24 precodes the FTN signal in order to compensate for ISI, using methods that are described below. These methods typically do not require any feedback from receiver 40 in order to compute or apply the precoding operation. Example transmitter and receiver configurations are discussed below.

In the present example, system 20 comprises a Digital Video Broadcasting (DVB) satellite system. DVB systems are specified, for example, by the European Telecommunications Standards Institute (ETSI) in standard EN 302 307 version 1.1.2, entitled "Digital Video Broadcasting (DVB); Second Generation Framing Structure, Channel Coding and Modulation Systems for Broadcasting, Interactive Services, News Gathering and Other Broadband Satellite Applications," June, 2006, which is incorporated herein by reference. Alternatively, system 20 may conform to any other suitable communication standard or protocol.

In some embodiments, transmitter 24 is installed in satellite 32 rather than on the ground. In these embodiments, the transmitter typically accepts input data from the satellite and transmits it to receiver 40 on the ground. This configuration is applicable, for example, in imaging and remote sensing satellite systems, in which the satellite transmits locally-gathered information. Placing transmitter 24 in the satellite can also be useful in regenerative satellite communication systems, in which the satellite demodulates the signals it receives from the ground, and re-modulates them before transmission. Further alternatively, the methods and systems described herein are not limited to satellite applications, and can be used in any other suitable communication application.

FTN Signaling with Lattice Precoding

Figure 2:
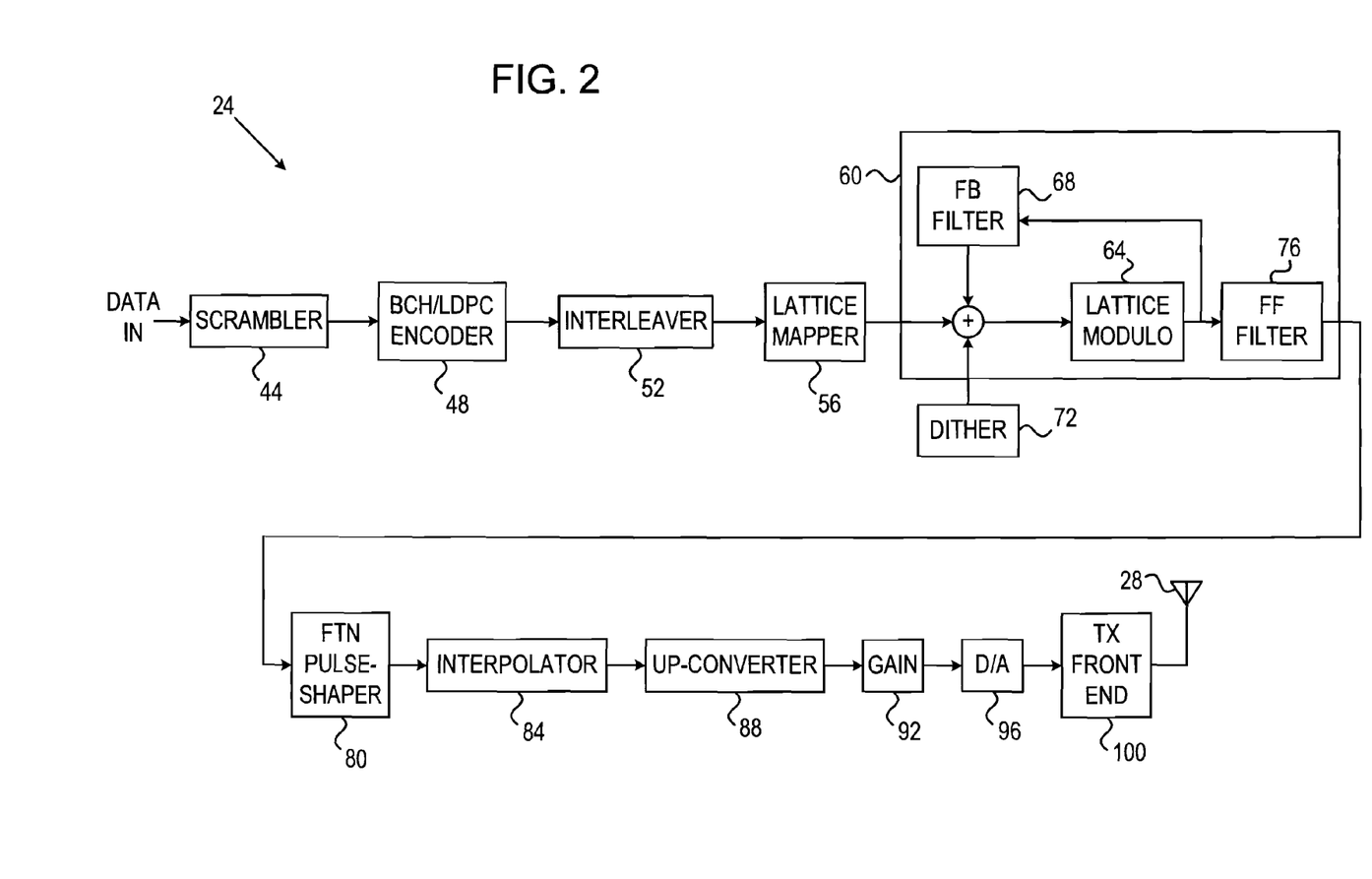
FIG. 2 is a block diagram that schematically illustrates a transmitter that uses lattice precoding and Faster-Than-Nyquist (FTN) signaling, in accordance with an embodiment of the present invention.

FIG. 2 is a block diagram that schematically illustrates the internal structure of transmitter 24, in accordance with an example embodiment of the present invention. Transmitter 24 comprises a scrambler 44, which scrambles (randomizes) the input data. An encoder 48 encodes the scrambled data with an Error Correction Code (ECC). In the present example, the encoder applies a Bose-Chaudhuri-Hocquenghem (BCH) code followed by a Low Density Parity Check (LDPC) code. Alternatively, however, any other suitable type of ECC can also be used. An interleaver 52 interleaves the encoded data.

A lattice mapper 56 maps the data bits produced by interleaver 52 to a set of constellation symbols defined in a certain signal space. The signal space may comprise, for example, a two-dimensional In-phase/Quadrature (I/Q) plane, or a signal space having any desired number of dimensions. Each constellation symbol is represented by a respective coordinate in the signal space. Symbol constellations that can be used by mapper 56 may comprise, for example, various Phase Shift Keying (PSK) or Quadrature Amplitude Modulation (QAM) constellations, or any other suitable constellation. Thus, mapper 56 produces a sequence of modulated symbols, each symbol representing one or more bits.

Transmitter 24 comprises a lattice precoder 60, which applies a lattice precoding operation to the symbol sequence produced by mapper 56. The precoding operation pre-compensates for ISI in the transmitted signal, which is caused by the FTN scheme and possibly other ISI sources. In other words, precoder 60 produces a sequence of precoded symbols which, once converted into a FTN signal and demodulated by an FTN receiver, contain little or no ISI.

Precoder 60 comprises a lattice modulo unit 64, a feedback filter 68 and a feed-forward filter 76. Modulo unit 64 applies a modulo operation to the symbols. The output of unit 64 is filtered by filter 68, fed-back and summed with the symbol sequence produced by mapper 56, and then provided as input to unit 64. The output of modulo unit 64 is filtered by feed-forward filter 76, and provided as the precoder output.

Feedback filter 68 and feed-forward filter 76 typically comprise digital filters, such as Finite Impulse Response (FIR) filters, having multiple coefficients. The filter coefficients determine the filtering operation carried out by precoder 60. Filters 68 and 76 can be implemented using any suitable filter design technique. For example, these filters may implement Zero-Forcing (ZF) lattice precoding or a Minimum Mean Square Error (MMSE) lattice precoding. ZF and MMSE schemes are described, for example, in the article "Achievable Rates for Tomlinson-Harashima Precoding" by Wesel and Cioffi, cited above.

By configuring filters 68 and 76, precoder 60 may apply any suitable precoding scheme that applies modulo operations, such as the Tomlinson-Harashima scheme described in the articles "New Automatic Equalizer Employing Modulo Arithmetic" by Tomlinson and "Achievable Rates for Tomlinson-Harashima Precoding" by Wesel and Cioffi, cited above. As another example, precoder 60 may apply the Laroia-Tretter-Farvardin precoding scheme described in the article "A Simple and Effective Precoding Scheme for Noise Whitening on Intersymbol Interference Channels" by Laroia et al., cited above. As yet another example, precoder 60 may apply the lattice coding scheme described in the article "Capacity and Lattice Strategies for Cancelling Known Interference" by Erez et al., cited above. Further alternatively, any other suitable lattice precoding technique can also be used.

In some embodiments, the lattice precoding operation can be combined with a lattice channel code. In these embodiments, encoder 48 may perform lattice coding instead of LDPC coding. An example of combining lattice channel codes with lattice precoding is described in the article "Nested Linear/Lattice Codes for Structured Multiterminal Binning" by Zamir et al., cited above.

The modulo operation applied by modulo unit 64 limits the amplitude of the output of unit 64, and thus the output of precoder 60. When the signal space is one-dimensional, the modulo operation is also one-dimensional and thus confines the precoder output to a predefined range of scalar values. When the signal space is two-dimensional (e.g., the I/Q plane), the modulo operation confines the precoder output to a two-dimensional cube. Similarly, a higher-dimensionality modulo operation limits the precoder output to a predefined multi-dimensional signal space volume.

Since modulo unit 64 confines the precoder output to a predefined volume in the signal space, the precoder may cause no more than a small and bounded increase in the transmitter output power. In other cases, typically depending on the specific constellation, the transmit power may remain the same or even reduced as a result of the modulo operation. This feature is important, for example, in power-limited applications such as in satellite transmitters.

In some embodiments, the transmitter comprises a dither circuit 72. Circuit 72 inserts a known dithering signal into the transmitted signal, in order to further randomize it. A similar dithering circuit in the receiver (addressed further below) removes the dithering signal from the received signal.

The sequence of precoded symbols generated by precoder 60 is provided to a FTN pulse shaper 80. Pulse shaper 80 filters the precoded symbols with a predefined pulse shape denoted p1(t). In some embodiments, the pulse shape comprises a raised-cosine shape. Alternatively, however, any other suitable pulse shape can also be used.

Figure 3:
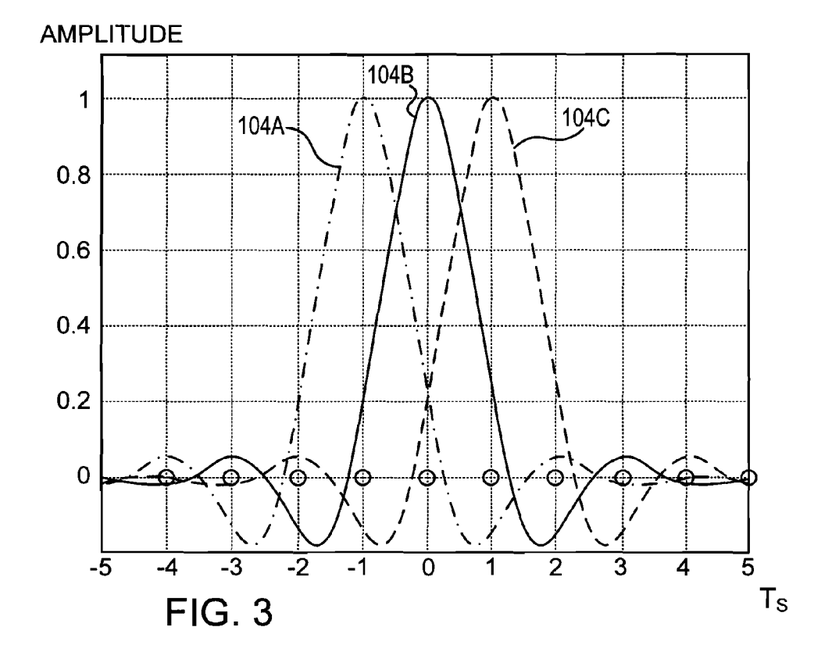
FIG. 3 is a graph showing FTN signals, in accordance with an embodiment of the present invention.

The pulse shaper generates a sequence of pulse-shaped symbols at a Faster-Than-Nyquist rate. In other words, the symbol rate of the pulse-shaped symbol sequence is higher than the Nyquist rate defined for the given pulse shape. As noted above, the Nyquist condition requires that $$p(kT_S) = \begin{cases} 0, & k \neq 0 \\ 1, & k = 0 \end{cases}$$

for some symbol period $T_S$, wherein p(t)=conv(p1)(t),p2(t)). Pulse shaper 80 generates a sequence of pulse-shaped symbols at a symbol rate ($1/T_S$) at which the above condition is not met. An example of a sequence of pulse-shaped FTN symbols is shown in FIG. 3 below.

Transmitter 24 applies further processing to the sequence of pulse-shaped symbols produced by pulse shaper 80, in order to transmit it to satellite 32. In the example of FIG. 2, an interpolator 84 interpolates the symbol sequence, i.e., increases its sampling rate. A digital up-converter 88 up-converts the interpolated signal to Intermediate Frequency (IF). A gain stage 92 amplifies the digital IF signal. A Digital-to-Analog (D/A) converter 96 converts the digital signal to an analog signal. A transmitter front end 100 up-converts the analog signal to Radio Frequency (RF) and amplifies the RF signal using a Power Amplifier (PA, not shown in the figure). The amplified RF signal is transmitted via antenna 28 toward satellite 32.

The Faster-Than-Nyquist rate of the symbol sequence produced by pulse shaper 80 causes ISI in the transmitted signal. The lattice precoding operation applied by precoder 60 compensates for this ISI. The FTN-related ISI in the signal depends on factors such as the pulse shape and the FTN factor (the ratio between the actual rate of the FTN symbol sequence and the Nyquist rate). Thus, in order to compensate for this ISI, the coefficients of filters 68 and 76 are typically computed based on these factors (which are usually known in advance and often constant).

In addition to compensating for FTN-related ISI, lattice precoder 60 may compensate for other ISI sources. Additional ISI that may be corrected by the lattice precoding operation may be caused, for example, by transmitter front end 100 and/or by analog filtering circuitry in satellite 32 (e.g., input multiplexing and output de-multiplexing). This sort of ISI is typically known in advance. Thus, in some embodiments, precoder 60 may compensate for one or more ISI sources in the transmitter. The coefficients of filters 68 and 76 are typically computed based on the additional ISI sources, as well.

FIG. 3 is a graph showing a sequence of pulse-shaped symbols generated at a Faster-Than-Nyquist rate, in accordance with an embodiment of the present invention. The present example shows three raised-cosine pulses 104A ... 104C. The pulses are generated using a FTN factor of 1.25, i.e., at a rate that is 1.25 times the Nyquist rate. As can be seen in the figure, the pulse values are not necessarily zero for $t=k \cdot T_S$, $k \neq 0$.

Figure 4:
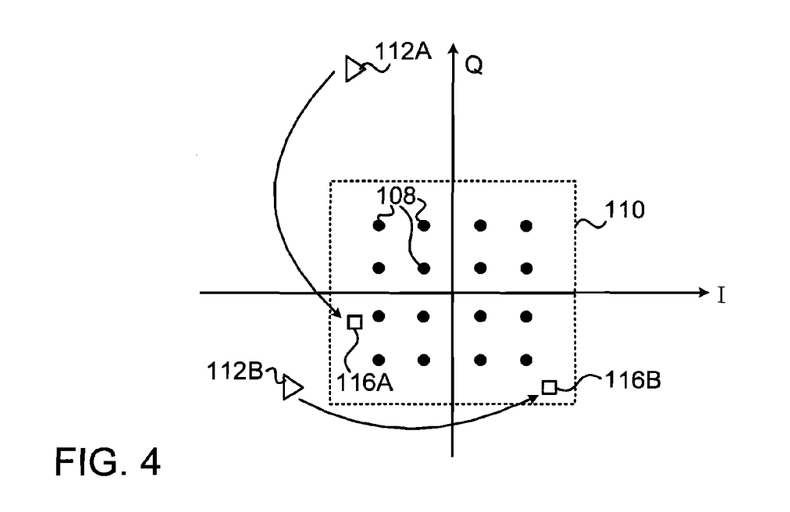
FIG. 4 is a signal-space diagram showing the effect of lattice precoding, in accordance with an embodiment of the present invention.

FIG. 4 is a signal-space diagram showing the effect of lattice precoding that uses a cubic-modulo operation, in accordance with an embodiment of the present invention. The example of FIG. 4 shows a 16-QAM constellation, comprising sixteen constellation symbols, in the I/Q plane. At the output of lattice mapper 56, the sixteen constellation points are produced at respective signal points (coordinates) 108 in the I/Q plane.

Modulo unit 64 applies a two-dimensional modulo operation that causes the precoded symbols at the precoder output to lie within a two-dimensional volume 110 in the I/Q plane. For example, at a given point in time, the output of feedback filter 68 may fall at a signal point 112A, which is outside of volume 110. The modulo operation of unit 64 moves this point to a point 116A, which is within volume 110. Similarly, when the output of feedback filter 68 is at a point 112B, the modulo operation moves this point to a point 116B inside volume 110.

As can be seen in the figure, signal points within volume 110 are limited in amplitude, and can only become marginally higher-power than constellation points 108. Therefore, by using the modulo operation, precoder 60 may cause no more than a small and bounded increase in the transmitted signal amplitude.

Figure 5:
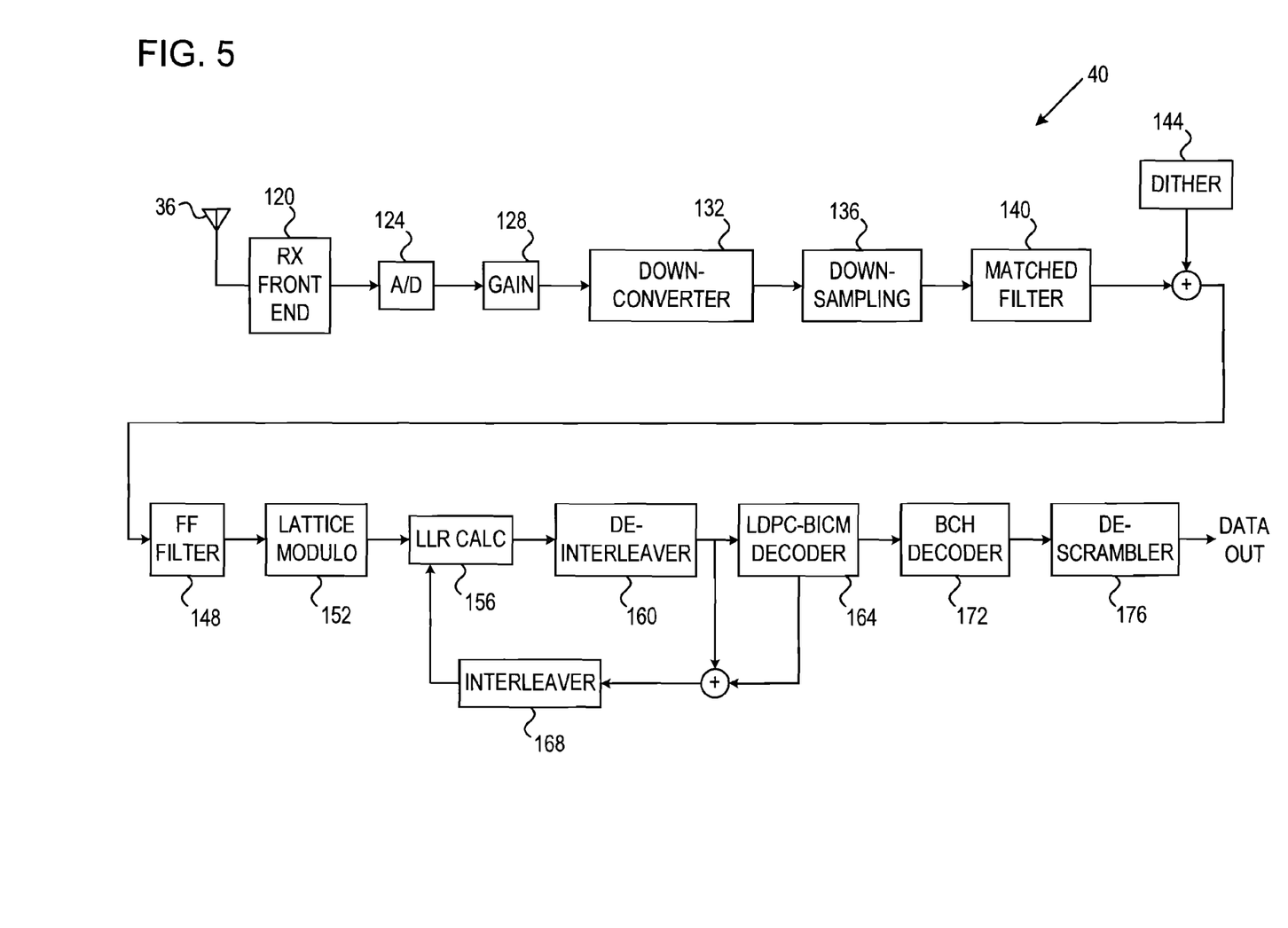
FIG. 5 is a block diagram that schematically illustrates a receiver for lattice-precoded FTN signals, in accordance with an embodiment of the present invention.

FIG. 5 is a block diagram that schematically illustrates a receiver 40 for lattice-precoded FTN signals, in accordance with an embodiment of the present invention. Receiver 40 can be used, for example, to receive the FTN signals transmitted by transmitter 24 of FIG. 2 above.

Receiver 40 receives an RF signal from satellite 32 via antenna 36. A receiver front end 120 down-converts the signal, and the signal is digitized by an Analog-to-Digital (A/D) converter 124. A gain stage 128 amplifies the signal, and a digital down-converter 132 down-converts the signal to baseband. A down-sampler (decimator) 136 reduces the sampling rate of the baseband signal. A matched filter 140 filters the signal with a pulse-shape, which typically matches the pulse-shape used by pulse shaper 80 in the transmitter. In some embodiments, the receiver comprises a dither circuit 144. Circuit 144 removes the dithering applied by circuit 72 in the transmitter.

The receiver may comprise a feed-forward filter (equalizer) 148, which can be used to equalize the channel response and/or remove residual ISI in the received signal. A lattice modulo unit 152 performs a modulo operation that is similar to the operation applied by precoder 60 in the transmitter. The sequence of symbols at the output of unit 152 is typically equalized and free of ISI.

In the receiver of FIG. 5, the LDPC code is decoded in a soft decoding process using a Log Likelihood Ratio (LLR) calculation module, a de-interleaver 160, an LDPC Bit Interleaved Coded Modulation (BICM) decoder 164 and an interleaver 168. Module 156 computes soft decoding metrics, such as LLRs, of the received bits. De-interleaver 160 applies a de-interleaving operation, which is the inverse of the interleaving operation applied by interleaver 52 in the transmitter. Decoder 164 decodes the LDPC code applied by encoder 48, based on the soft metrics provided by module 156. In some embodiments, extrinsic information produced by decoder 164 is fed back to unit 156, interleaved by interleaver 168, and used for updating the soft metric values.

A BCH decoder 172 decodes the BCH code applied by encoder 48. A de-scrambler 176 de-scrambles the decoded bits, i.e., reverses the operation of scrambler 44 in the transmitter. The de-scrambled data is provided as output.

The configurations of transmitter 24 of FIG. 2 and receiver 40 of FIG. 5 are example configurations, which are chosen purely for the sake of conceptual clarity. In alternative embodiments, any other suitable configuration can also be used. For example, FIG. 2 describes a digital IF transmitter, which up-converts the signal digitally from baseband to IF and then converts it to an analog signal using a single D/A converter. In alternative embodiments, the transmitter may implement a complex, or zero-IF, configuration. In these embodiments, up-converter 88 is omitted, and the baseband signal is converted to an analog signal by a pair of D/A converters connected in quadrature. Each D/A converter is typically preceded by a respective gain stage similar to gain stage 92 of FIG. 2. As another example, FIG. 5 describes a digital IF receiver, which digitizes the signal using a single A/D converter and then down-converts the signal digitally from IF to baseband. In alternative embodiments, the receiver may implement a complex, or zero-IF, configuration. In these embodiments, down-converter 132 is omitted, and the received signal is digitized by a pair of A/D converters connected in quadrature. Each A/D converter is typically followed by a respective gain stage similar to gain stage 132 of FIG. 5.

The different digital elements in the transmitter and receiver can be implemented using any suitable hardware, such as in an Application-Specific Integrated Circuit (ASIC) or Field-Programmable Gate Array (FPGA). Additionally or alternatively, some transmitter and/or receiver elements can be implemented in software, such as using one or more Digital Signal Processor (DSP) devices, or using a combination of hardware and software elements. For example, computation of filter coefficients (e.g., of filters 68, 76 and/or 148) may be performed in software.

Note that the precoding operation applied by precoder 60, and in particular the coefficients of filters 68 and 76, are computed exclusively in transmitter 24 and are independent of any feedback from receiver 40. This feature is especially useful in applications in which the majority of ISI is caused by the transmitter. In the present satellite application, for example, the communication channel does not contribute considerable ISI, and the majority of ISI is caused by the higher rate of the FTN signaling. This ISI contribution can be modeled in advance (e.g., based on the known pulse shape used for pulse shaping and the known FTN factor), and therefore the coefficients of filters 68 and 76 can be set without any receiver feedback.

In some embodiments, the precoding operation takes into consideration (and pre-compensates for) other ISI sources in the transmitter circuitry, such as transmitter front-end filtering and satellite filtering. Since these effects are typically constant, the coefficients of filters 68 and 76 can be set to compensate for them, again without any feedback from the receiver.

Figure 6:
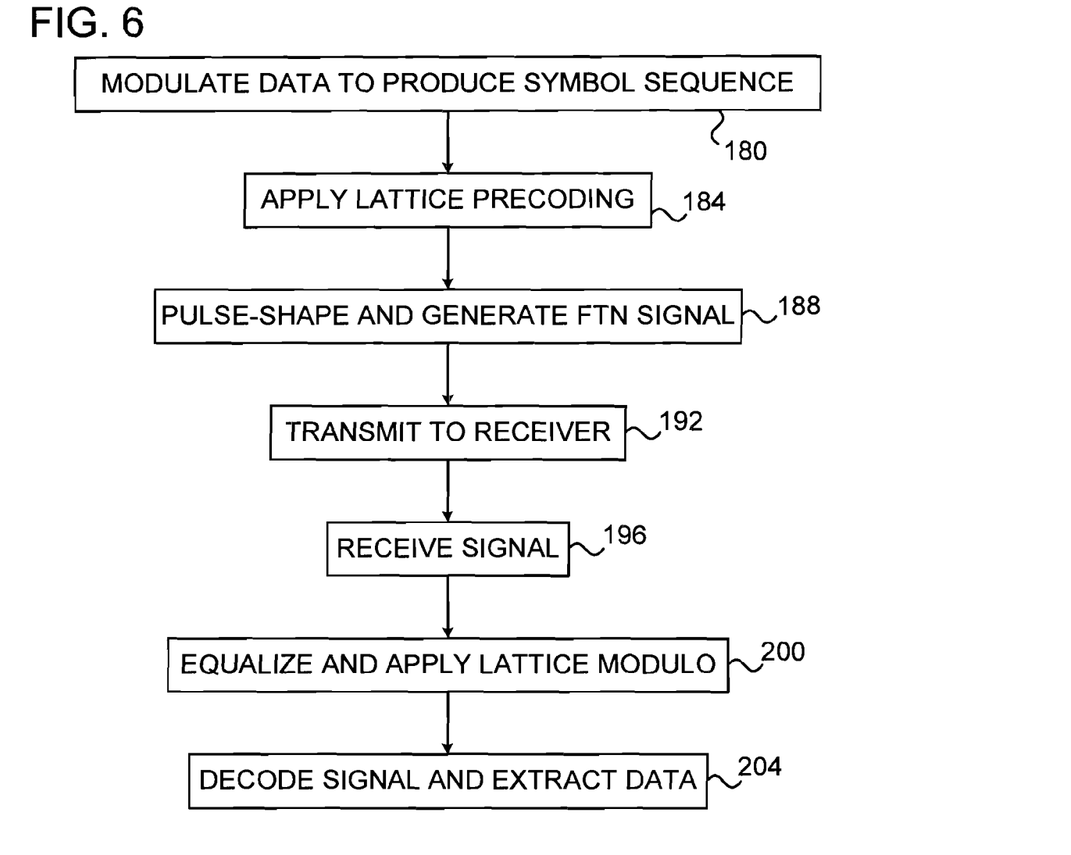
FIGS. 6 and 7 are flow charts that schematically illustrate methods for communication, in accordance with embodiments of the present invention.

FIG. 6 is a flow chart that schematically illustrates a method for communication, in accordance with an embodiment of the present invention. The method begins with transmitter 24 of FIG. 2 above (and in particular mapper 56) modulating input data to produce a sequence of symbols, at a modulation step 180. Lattice precoder 60 applies lattice precoding to the symbol sequence, at a precoding step 184. Any suitable precoding scheme, such as the example schemes described and cited above, can be used. Pulse shaper 80 pulse-shapes the symbol sequence using a given pulse shape (e.g., a raised-cosine pulse shape), at a pulse shaping step 188. Pulse shaper 80 generates a FTN signal, i.e., a sequence of pulse-shaped symbols at a rate that is higher than the Nyquist rate of the given pulse shape. Transmitter 24 transmits the FTN signal via satellite 32 to receiver 40, at a FTN transmission step 192.

Receiver 40 of FIG. 5 above receives and digitizes the FTN signal, at a FTN reception step 196. The receiver typically equalizes the received signal and applies lattice modulo, at an equalization and modulo step 200. Equalization is carried out by equalizer 148. For example, equalizer 148 may compensate for any residual transmitter-related ISI, and/or for ISI caused by the communication channel or the receiver. Lattice modulo is applied by lattice modulo unit 152. The receiver decodes the signal and extracts the data, at a decoding step 204. In the present example, the receiver decodes the LDPC and BCH codes, as explained above. The extracted data is provided as output.

FTN Signaling with Non-FTN Receivers

In some embodiments of the present invention, a FTN transmitter transmits FTN signals to a receiver that does not support FTN. The receiver receives the FTN signal and compensates for the FTN-related ISI (i.e., the ISI caused by the signal's symbol rate being higher than the Nyquist rate), even though it was not designed for this purpose. For example, the receiver may comprise an adaptive equalizer for compensating for ISI caused by the communication channel. This equalizer can be used to compensate for the FTN-related ISI, as well, irrespective of the ISI source.

Figure 7:
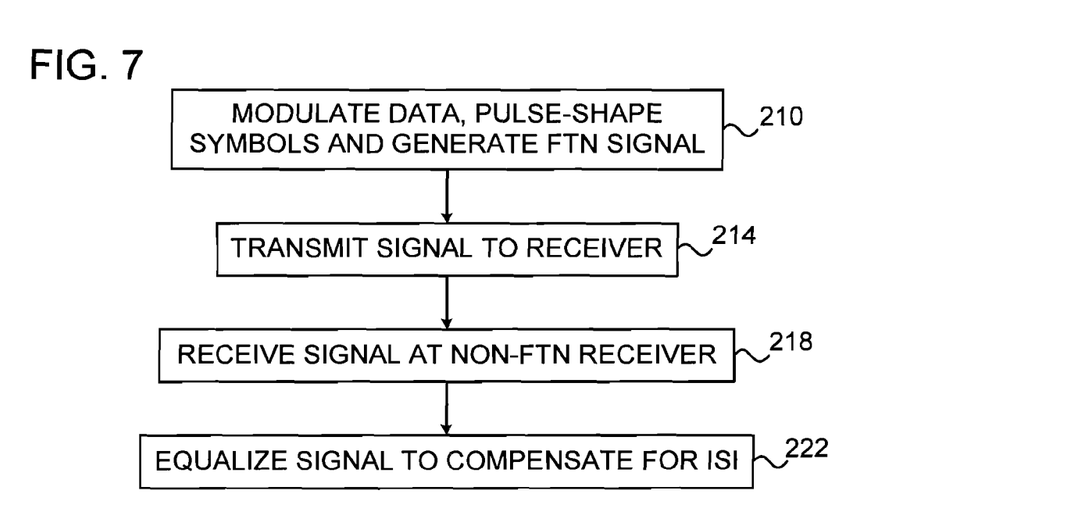

FIG. 7 is a flow chart that schematically illustrates a method for communication, in accordance with an embodiment of the present invention. The method begins with the transmitter generating a FTN signal, at a signal generation step 210. The transmitter typically modulates data onto symbols, pulse-shapes the symbols and generates a sequence of pulse-shaped symbols at a rate that is higher than the Nyquist rate. Unlike the scheme described in FIGS. 2, 5 and 6 above, lattice precoding is typically not performed, since the receiver does not support lattice modulo operations. Dithering is also typically not performed, since the receiver does not support removal of the dithering signal. The transmitter transmits the FTN signal to the receiver, at a transmission step 214.

The receiver receives the FTN signal, at a reception step 218. As noted above, the receiver is not designed or specified for receiving FTN signals. Typically, the receiver is notified of, or configured with, the actual symbol rate (baud rate) of the FTN signal. From the receiver's point of view, the received signal contains ISI, but the receiver has no information as to the source or cause of this ISI. The receiver compensates for the FTN-related ISI, at a compensation step 222, so as to extract the data from the signal. Typically, the non-FTN receiver comprises an adaptive equalizer, for compensating for channel-related ISI. This equalizer can be used to compensate for FTN-related ISI, as well, even though it was not originally designed for this purpose. Note that the receiver's performance in mitigating channel-related ISI may be degraded in this scenario, since the equalizer is now used for correcting both channel-related and FTN-related ISI simultaneously. In many applications, however, this degradation is tolerable.

In some embodiments, a FTN transmitter can operate in two operational modes—a FTN-aware mode and a legacy mode. In the FTN-aware mode, the transmitter transmits to a receiver that is designed to receive FTN signals. In the legacy mode, the transmitter transmits to a receiver that is specified for receiving only signals whose symbol rate does not exceed the Nyquist rate. Typically, operating in the FTN-aware mode enables higher performance, whereas operating in the legacy mode enables backward compatibility to legacy receivers. This dual-mode operation can be used, for example, for transmitting FTN signals to second generation DVB (DVB-S2) receivers that were not originally designed or specified for FTN operation. (DVB-S2 is specified in the ETSI EN 302 307 standard, cited above.)

For example, when transmitting to a receiver such as the receiver of FIG. 5 above, the transmitter may transmit in a FTN-aware mode that applies lattice precoding, because the receiver is designed to decode lattice-precoded signals. As a result, the residual ISI that the receiver has to correct is relatively small. When transmitting to a receiver that does not support FTN, the transmitter may transmit in a legacy mode in which precoding is disabled. In this mode, both FTN-related and channel-related ISI are corrected by the receiver.

In some cases, a non-FTN receiver comprises an equalizer whose coefficients can be initialized. When the characteristics of the FTN signaling used by the transmitter (e.g., pulse shape and FTN factor) are known, the coefficients of the receiver equalizer may be initialized with pre-computed values that compensate for the ISI caused by the FTN signaling.

Although the embodiments described herein mainly address the use of FTN in satellite communication systems, the methods and systems described herein can also be used in various other wireless and wire-line communication applications, such as cable communication, communication over twisted-pair wire and Ethernet communication. Typically although not necessarily, such applications involve communication over a constant or slowly-varying channel. As another example, the disclosed techniques can be used in Orthogonal Frequency Division Multiplexing (OFDM) systems, in which the communication channel of each sub-carrier bin may be considered constant or slowly-varying. For example, the transmitter and receiver scheme of FIGS. 2 and 5 above can be applied to an OFDM system, by performing the transmitter-side lattice precoding and receiver-side modulo operations per sub-carrier bin.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
modulating data to produce a series of symbols defined in a signal space;
pulse-shaping the symbols using a given pulse shape;
transmitting to a receiver a signal, which comprises a sequence of the pulse-shaped symbols transmitted at a symbol rate that is higher by a given Faster-Than-Nyquist (FTN) factor than a Nyquist rate defined for the given pulse shape; and
prior to pulse-shaping the symbols, pre-compensating for Inter-Symbol Interference (ISI) in the signal by applying to the symbols a lattice precoding operation that is defined based on the given FTN factor, confines the symbols to a predefined volume in the signal space and is computed independently of any feedback from the receiver.

2. The method according to claim 1, wherein transmitting the signal comprises transmitting the signal toward a satellite, so as to cause the satellite to retransmit the signal to the receiver.

3. The method according to claim 1, wherein modulation of the data, pulse-shaping of the symbols and pre-compensation for the ISI are performed on-board a satellite.

4. The method according to claim 1, wherein transmitting the signal comprises transmitting a Digital Video Broadcast (DVB) signal.

5. The method according to claim 1, wherein applying the lattice precoding operation comprises performing a modulo operation on the symbols.

6. The method according to claim 1, wherein applying the lattice precoding operation comprises applying a Tomlinson-Harashima Precoding (THP) process.

7. The method according to claim 1, wherein applying the lattice precoding operation comprises applying a Laroia-Tretter-Farvardin precoding process.

8. The method according to claim 1, wherein applying the lattice precoding operation comprises jointly applying the lattice precoding operation and a lattice channel coding operation.

9. The method according to claim 1, wherein applying the lattice precoding operation comprises filtering the symbols using one or more filters having coefficients, and comprising setting the coefficients independently of any feedback from the receiver.

10. The method according to claim 1, wherein applying the lattice precoding operation comprises defining the lattice precoding operation to compensate for additional ISI caused by transmitter circuitry that transmits the signal.

11. The method according to claim 1, and comprising applying a dithering signal to the transmitted signal, and removing the dithering signal at the receiver.

12. The method according to claim 1, and comprising receiving the signal and reversing the lattice precoding operation at the receiver, so as to extract the data from the signal.

13. A method for communication, comprising:
pulse-shaping a series of symbols using a given pulse shape;
generating a signal, which comprises a sequence of the pulse-shaped symbols transmitted at a symbol rate that is higher than a Nyquist rate defined for the given pulse shape;

transmitting the signal to a receiver, which is specified for receiving only signals whose symbol rates do not exceed the Nyquist rate; and at the receiver, equalizing the signal, having the symbol rate that is higher than a Nyquist rate, using an equalizer designed for signals that do not exceed the Nyquist rate.

14. The method according to claim 13, wherein equalizing the signal comprises compensating for Inter-Symbol Interference (ISI) introduced by the symbol rate higher than the Nyquist rate.

15. The method according to claim 14, wherein equalizing the signal comprises initializing the equalizer with pre-computed coefficient values that compensate for the ISI.

16. The method according to claim 13, wherein transmitting the signal comprises transmitting the signal toward a satellite, so as to cause the satellite to retransmit the signal to the receiver.

17. The method according to claim 13, wherein pulse-shaping of the symbols and generation of the signal are performed on-board a satellite.

18. The method according to claim 13, wherein transmitting the signal comprises transmitting a Digital Video Broadcast (DVB) signal.

19. The method according to claim 13, wherein transmitting the signal comprises operating in a first operational mode when transmitting to a first type of receivers specified for receiving first signals whose symbol rates exceed the Nyquist rate, and operating in a second operational mode, different from the first operational mode, when transmitting to a second type of receivers specified for receiving only second signals whose symbol rates do not exceed the Nyquist rate.

20. The method according to claim 19, wherein operating in the first operational mode comprises precoding the signal prior to transmission, and wherein operating in the second operational mode comprises refraining from precoding the signal.

21. The method according to claim 19, wherein the second type of the receivers conform to a second generation Digital Video Broadcast (DVB-S2) specification.

22. A communication apparatus, comprising:
transmission circuitry, which is configured to modulate data so as to produce a series of symbols defined in a signal space, to pulse-shape the symbols using a given pulse shape, and to transmit to a receiver a signal, which comprises a sequence of the pulse-shaped symbols transmitted at a symbol rate that is higher by a given Faster-Than-Nyquist (FTN) factor than a Nyquist rate defined for the given pulse shape; and a precoding unit, which is configured to pre-compensate for Inter-Symbol Interference (ISI) in the signal prior to pulse-shaping the symbols by applying to the symbols a lattice precoding operation that is defined based on the given FTN factor, confines the symbols to a predefined volume in the signal space and is computed independently of any feedback from the receiver.

23. The apparatus according to claim 22, wherein the transmission circuitry is configured to transmit the signal toward a satellite, so as to cause the satellite to retransmit the signal to the receiver.

24. The apparatus according to claim 22, wherein the transmission circuitry and the precoding unit are located on-board a satellite, and wherein the transmission circuitry is configured to transmit the signal from the satellite to the receiver.

25. The apparatus according to claim 22, wherein the signal comprises a Digital Video Broadcast (DVB) signal.

26. The apparatus according to claim 22, wherein the precoding unit is configured to apply the lattice precoding operation by performing a modulo operation on the symbols.

27. The apparatus according to claim 22, wherein the lattice precoding operation comprises a Tomlinson-Harashima Precoding (THP) process.

28. The apparatus according to claim 22, wherein the lattice precoding operation comprises a Laroia-Tretter-Farvardin precoding process.

29. The apparatus according to claim 22, wherein the precoding unit is configured to jointly apply the lattice precoding operation and a lattice channel coding operation.

30. The apparatus according to claim 22, wherein the precoding unit comprises one or more filters having coefficients, which are configured to filter the symbols, and wherein the precoding unit is configured to set the coefficients independently of any feedback from the receiver.

31. The apparatus according to claim 22, wherein the precoding unit is configured to define the lattice precoding operation to compensate for additional ISI caused by the transmission circuitry.

32. The apparatus according to claim 22, wherein the transmission circuitry is configured to apply a dithering signal to the transmitted signal.

33. The apparatus according to claim 22, and comprising a receiver, which is configured to receive the signal and to reverse the lattice precoding operation, so as to extract the data from the signal.

34. A communication system, comprising:
a transmitter, which is configured to pulse-shape a series of symbols using a given pulse shape, to generate a signal, which comprises a sequence of the pulse-shaped symbols transmitted at a symbol rate that is higher than a Nyquist rate defined for the given pulse shape, and to transmit the signal over a communication channel; and a receiver, which is specified for receiving only signals whose symbol rates do not exceed the Nyquist rate, and which is configured to receive the signal from the communication channel, to equalize the signal, having the symbol rate that is higher than a Nyquist rate, using an equalizer designed for signals that do not exceed the Nyquist rate, and to decode the received and equalized signal.

35. The system according to claim 34, wherein the receiver is configured to apply the equalizer to the received signal so as to compensate for Inter-Symbol Interference (ISI) introduced by the symbol rate higher than the Nyquist rate.

36. The system according to claim 35, wherein the equalizer is initialized with pre-computed coefficient values that compensate for the ISI.

37. The system according to claim 34, wherein the transmitter is configured to transmit the signal toward a satellite, so as to cause the satellite to retransmit the signal to the receiver.

38. The system according to claim 34, wherein the transmitter is located on-board a satellite and is configured to transmit the signal from the satellite to the receiver.

39. The system according to claim 34, wherein the signal comprises a Digital Video Broadcast (DVB) signal.

40. The system according to claim 34, wherein the transmitter is configured to operate in a first operational mode when transmitting to a first type of receivers specified for receiving first signals whose symbol rates exceed the Nyquist rate, and to operate in a second operational mode, different from the first operational mode, when transmitting to a second type of receivers specified for receiving only second signals whose symbol rates do not exceed the Nyquist rate.

41. The system according to claim 34, wherein the transmitter is configured to precode the signal prior to transmission when operating in the first operational mode, and to refrain from precoding the signal when operating in the second operational mode.

42. The system according to claim 40, wherein the second type of the receivers conform to a second generation Digital Video Broadcast (DVB-S2) specification.

* * * * *